(12) United States Patent
Chen et al.

(10) Patent No.: US 12,061,413 B2
(45) Date of Patent: Aug. 13, 2024

(54) ELEVATING MECHANISM AND ELECTRONIC DEVICE INCLUDING THE SAME

(71) Applicant: WISTRON CORP., New Taipei (TW)

(72) Inventors: Kuang-Wen Chen, New Taipei (TW); Chih-Yi Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 139 days.

(21) Appl. No.: 17/820,265

(22) Filed: Aug. 17, 2022

(65) Prior Publication Data
US 2023/0333455 A1 Oct. 19, 2023

(30) Foreign Application Priority Data

Apr. 15, 2022 (TW) .................................. 111114504

(51) Int. Cl.
*G03B 17/56* (2021.01)
*F16M 13/02* (2006.01)

(52) U.S. Cl.
CPC ......... *G03B 17/561* (2013.01); *F16M 13/022* (2013.01)

(58) Field of Classification Search
None
See application file for complete search history.

(56) References Cited

FOREIGN PATENT DOCUMENTS

| CN | 109995904 A | * | 7/2019 | ............ H04M 1/026 |
|---|---|---|---|---|
| CN | 111092976 A | * | 5/2020 | |
| CN | 111142317 A | * | 5/2020 | ............ G03B 17/12 |
| CN | 110062146 B | * | 10/2020 | .......... H04N 5/2257 |
| CN | 109862147 B | * | 12/2020 | |
| CN | 212064178 U | * | 12/2020 | |
| CN | 110071988 B | * | 1/2021 | ............ H04M 1/026 |
| CN | 109976447 B | * | 3/2021 | |

OTHER PUBLICATIONS

TW Office Action dated Feb. 17, 2023 in Taiwan application No. 111114504.

* cited by examiner

*Primary Examiner* — Rodney E Fuller
(74) *Attorney, Agent, or Firm* — McClure, Qualey & Rodack, LLP (57) ABSTRACT

An elevating mechanism includes a base member, a first movable member, a second movable member, a first magnetic member, and a second magnetic member, the first movable member is movably disposed on the base member, the second movable member is movably disposed on the base member, the first magnetic member disposed on the first movable member, the second magnetic member corresponds to the first magnetic member and is disposed on the second movable member, when the second movable member is in a holding position, the first magnetic member and the second magnetic member are attracted to each other.

20 Claims, 7 Drawing Sheets

ELEVATING MECHANISM AND ELECTRONIC DEVICE INCLUDING THE SAME

CROSS-REFERENCE TO RELATED APPLICATIONS

This non-provisional application claims priority under 35 U.S.C. § 119(a) on Patent Application No(s). 111114504 filed in Taiwan (R.O.C.) on Apr. 15, 2022, the entire contents of which are hereby incorporated by reference.

TECHNICAL FIELD

The disclosure relates to an elevating mechanism, more particularly relates to an elevating mechanism capable of supporting a functional module, and an electronic device including the same.

BACKGROUND

In recent years, cameras have been widely used in video conferences, live streaming, online teaching, and other occasions and therefore are an indispensable part of electronic devices such as mobile phones, notebook computers, desktop computers, All-in-one (AIO) computers, and TV screens. This trend gradually changes the way people work and live.

Conventionally, the camera is arranged at the front bezel of the screen of TVs, computers, or mobile phones and exposed by a camera hole. But such an arrangement needs the bezel to be wide enough to cover or accommodate the camera and thus leading to a relatively wide bezel or non-display area at the front of the device.

SUMMARY

Accordingly, one aspect of the disclosure is to provide an elevating mechanism and an electronic device including the same which are capable of making a functional module thereon a pop-up component.

One embodiment of the disclosure provides an elevating mechanism includes a base member, a first movable member, a second movable member, a first magnetic member, and a second magnetic member. The first movable member is movably disposed on the base member, the second movable member is movably disposed on the base member, the first magnetic member is disposed on the first movable member, and the second magnetic member corresponds to the first magnetic member and is disposed on the second movable member. When the second movable member is in a holding position, the first magnetic member and the second magnetic member are attracted to each other.

One embodiment of the disclosure provides an electronic device including a housing and an elevating mechanism. The elevating mechanism includes a base member, a first movable member, a second movable member, a first magnetic member, and a second magnetic member. The base member is disposed on the housing, the first movable member is movably disposed on the base member, the second movable member is movably disposed on the base member, the first magnetic member is disposed on the first movable member, and the second magnetic member corresponds to the first magnetic member and is disposed on the second movable member. When the second movable member is in a holding position, the first magnetic member and the second magnetic member are attracted to each other.

According to the elevating mechanism and the electronic device in some embodiments of the disclosure, the first magnetic member and the second magnetic member are attracted to each other as the second movable member is in the holding position, thus moving the second movable member is also possible to make the first and second magnetic members repel each other. As such, the position of the first movable member relative to the base member is changeable by moving the second movable member. When a functional module is disposed on the first movable member, the functional module can be selectively secured in a specific position along with the first movable member. For example, the first movable member and a functional module thereon can be kept in the housing by the magnetic attraction between the first and second magnetic members, and the functional module can be raised from the side of the housing as the first movable member is moved by the magnetic repulsion between the first and second magnetic members. Accordingly, the elevating mechanism may be applied under or behind the screen panel of electronic devices such as televisions, computer screens, or mobile phones, to remove the functional module such as camera from the front of the screen to expand the screen area and narrow bezel and make the functional module a pop-up component. As such, when it needs to use the functional module, the functional module can be raised from a side of the device by the first movable member; when the functional module is not in use, the functional module can be hidden behind the screen panel by the first movable member. As discussed, the elevating mechanism of the disclosure is able to achieve a convenient operation of camera while being favorable for a high screen area proportion.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities. Unless specified or limited otherwise, the terms "mounted", "connected", "disposed", "fixed", and variations thereof are used broadly and encompass both direct and indirect mounting, connection, disposing, and fixing. Further, unless specified or limited otherwise, the phrase "in fluid communication with" may be used herein to describe a situation that air is allowed to flow through at least two of spaces, areas, slots, channels, passages, and/or openings.

Figure 1:
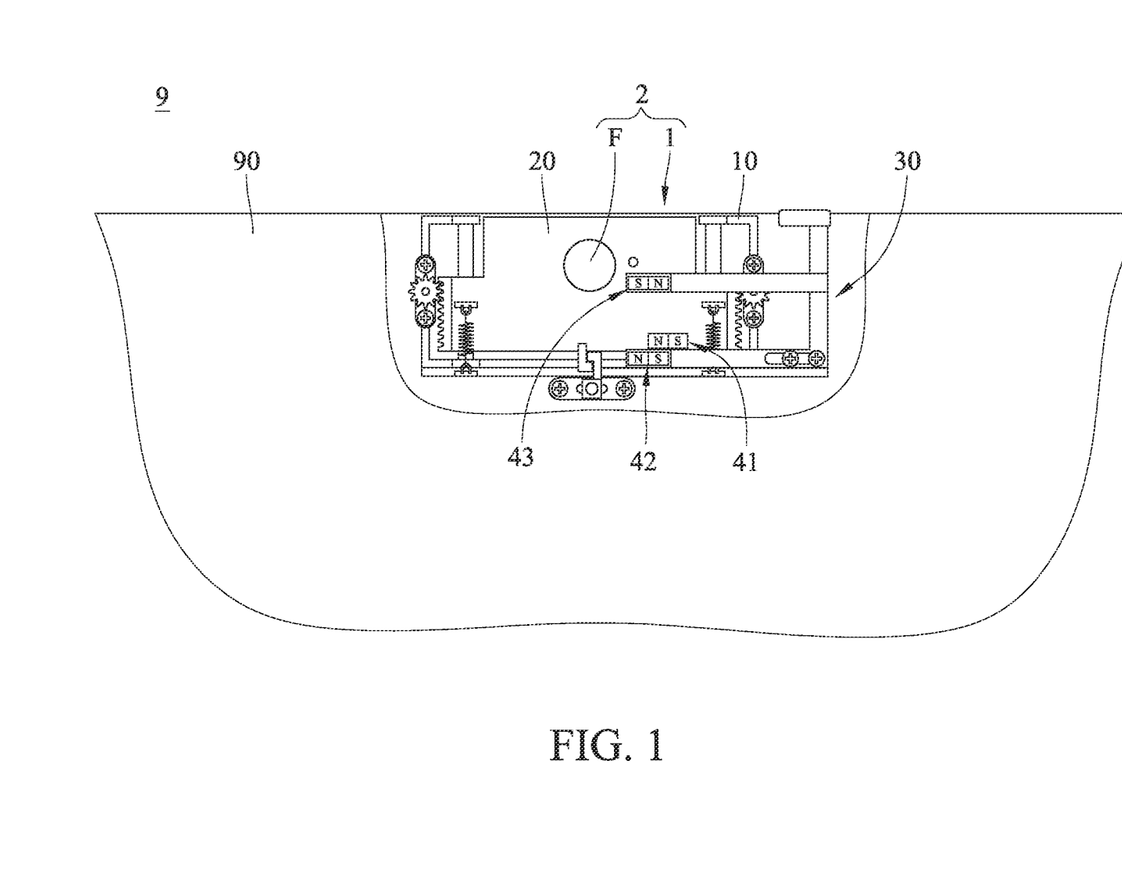
FIG. 1 is a partially enlarged view of an electronic device according to one embodiment of the disclosure.

Referring to FIG. 1, one embodiment of the disclosure provides an electronic device 9 having an elevating mechanism 1. The electronic device 9 may be, but is not limited to, a television, computer screen, projector, or a part thereof. The electronic device 9 may include a housing 90 configured to accommodate one elevating mechanism 1. In the drawings, the housing 90 may be illustrated in a partial section view for viewing the elevating mechanism 1 therein. It is noted that the types and applications of the electronic device 9 and the housing 90 disclosed are exemplary for better understanding the elevating mechanism 1 but are not intended to limit the invention.

In this embodiment, the elevating mechanism 1 is operable by a user to partially stick out of the housing 90 when the elevating mechanism 1 is hidden in the housing 90. In addition, in this embodiment, the elevating mechanism 1 may accommodate at least one functional module F therein, and the functional module F is allowed to be hidden in the housing 90 or sticking out of the housing 90 when it is driven by the elevating mechanism 1. The functional module F may be, but is not limited to, a sound receiving module, an infrared sensor, or a camera. In this embodiment, the functional module F and the elevating mechanism 1 may together form a sensing module 2. It is noted that the functional module F is exemplary for better understanding the elevating mechanism 1 but are not intended to limit the invention.

Figure 2:
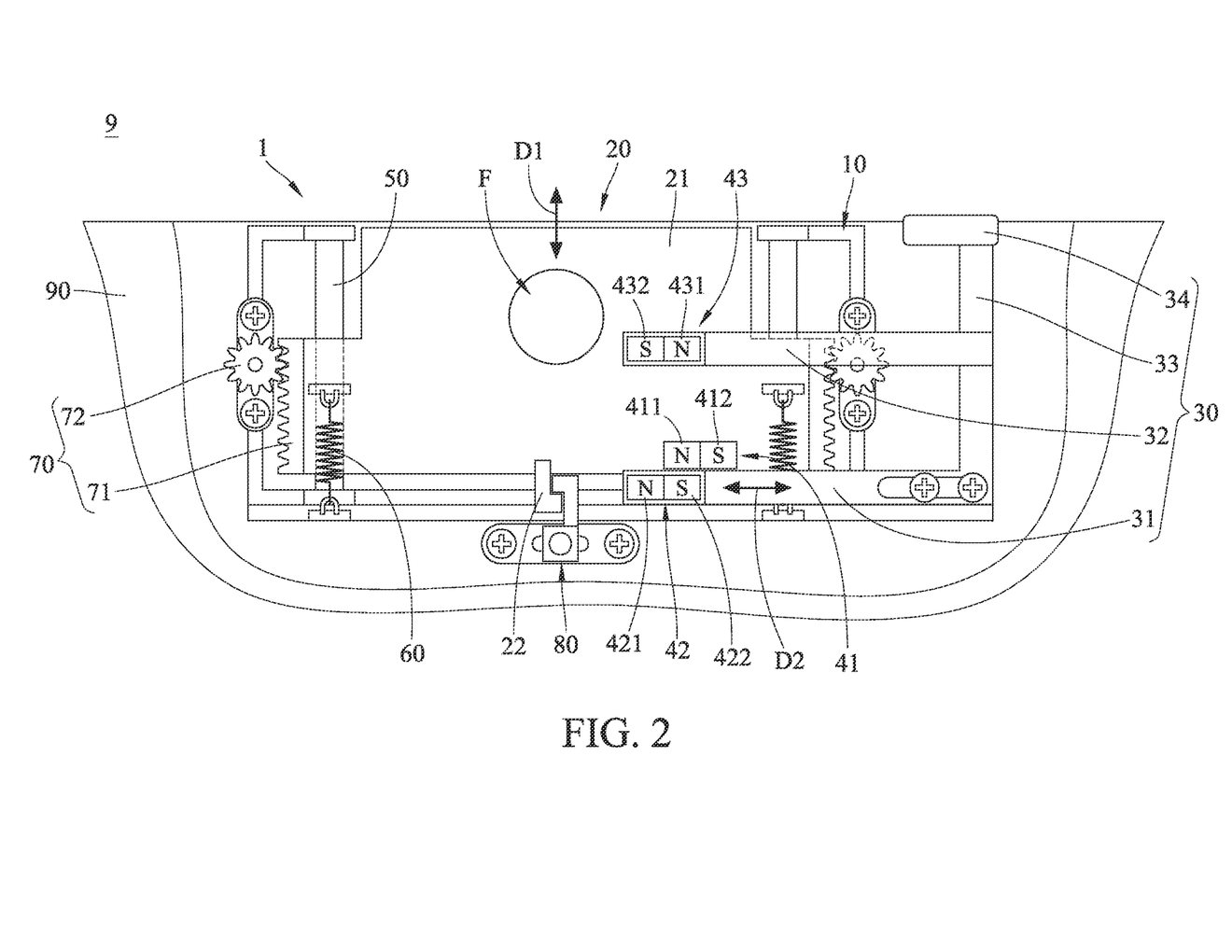
FIG. 2 is a partially enlarged view showing an elevating mechanism of the electronic device in FIG. 1.
Figure 3:
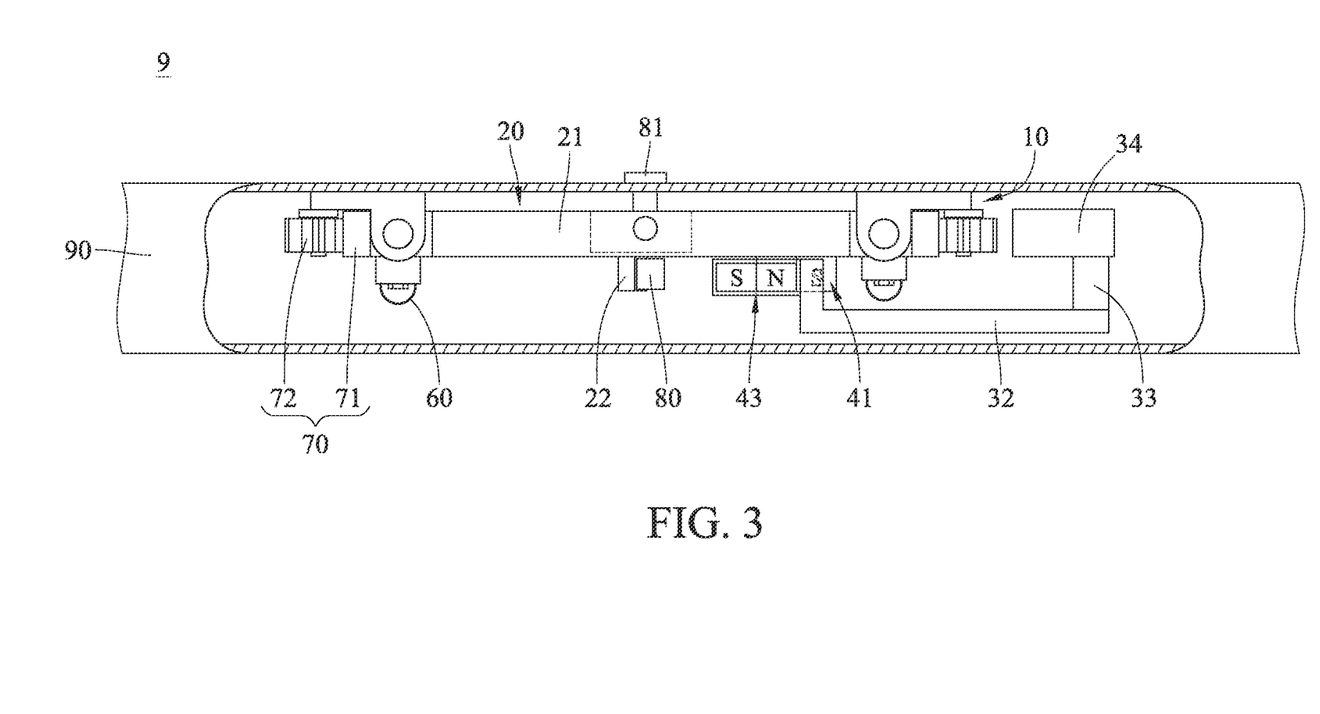
FIG. 3 is a partially enlarged top view of the electronic device in FIG. 1.

Please further refer to FIGS. 2-3 and the details of the elevating mechanism 1 are described accordingly. In this embodiment, the elevating mechanism 1 may include a base member 10, a first movable member 20 and a second movable member 30. The base member 10 may be fixed within the housing 90 by any suitable manner (e.g., screws, bolts, or welding). In other embodiments, the base member 10 may be integrally formed with the housing 90. The first movable member 20 is configured to accommodate or support the functional module F. The first movable member 20 is movably disposed on the base member 10. Specifically, the first movable member 20 may be slidably disposed on the base member 10 along a first movable direction D1 and therefore have a hidden position (as shown in FIGS. 1-4) and a lifted position (as shown in FIG. 5) relative to the base member 10. The second movable member 30 is movably disposed on the base member 10 or the housing 90. Specifically, the second movable member 30 may be slidably disposed on the base member 10 or the housing 90 along a second movable direction D2 and therefore have a holding position (as shown in FIGS. 1-4) and an activating position (as shown in FIG. 5) relative to the base member 10 and/or the first movable member 20. The second movable direction D2 is different from the first movable direction D1. For example, in this embodiment, the second movable direction D2 may be substantially perpendicular to the first movable direction D1. The second movable member 30 selectively switches positions along the second movable direction D2 so as to keep the first movable member 20 in the hidden position or cause the first movable member 20 to switch to the lifted position. The detail introductions are provided below.

In this embodiment, the first movable member 20 may include a main portion 21, the second movable member 30 may include a first extension portion 31, a second extension portion 32, and a connection portion 33. In addition, the elevating mechanism 1 may further include a first magnetic member 41, a second magnetic member 42, and a third magnetic member 43. The first magnetic member 41 is disposed on the main portion 21 of the first movable member 20. For example, the first magnetic member 41 may protrude from the surface of the main portion 21 of the first movable member 20.

The first extension portion 31 and the second extension portion 32 extend outwards from the connection portion 33. In the first movable direction D1, the first extension portion 31 and the second extension portion 32 each partially overlap with the first magnetic member 41 which is arranged on the main portion 21 of the first movable member 20. For example, the first extension portion 31 and the second extension portion 32 extend outwards from the same side of the connection portion 33 along a direction substantially parallel to the second movable direction D2. In a direction substantially parallel to the first movable direction D1, distal ends of the first extension portion 31 and the second extension portion 32 which are located away from the connection portion 33 overlap with the first magnetic member 41 which protrudes from the main portion 21 of the first movable member 20; in other words, the first magnetic member 41 which protrudes from the main portion 21 of the first movable member 20 is located between the distal portions of the first extension portion 31 and the second extension portion 32 which are located away from the connection portion 33.

Corresponding to the first magnetic member 41, the second magnetic member 42 and the third magnetic member 43 are respectively disposed on the first extension portion 31 and the second extension portion 32 so that the second magnetic member 42 and the third magnetic member 43 may overlap with the first magnetic member 41 in a direction substantially parallel to the first movable direction D1; in other words, the first magnetic member 41 may be located between the second magnetic member 42 and the third magnetic member 43. In this arrangement, the position switching of the second movable member 30 can cause an interaction between the first magnetic member 41 and the second magnetic member 42 and the third magnetic member 43 to keep the first movable member 20 in the hidden position or move the first movable member 20 towards the lifted position.

In detail, the first magnetic member 41 may include a first magnetic portion 411 and a second magnetic portion 412 which have opposite polarities. For example, the first magnetic portion 411 may be north pole while the second magnetic portion 412 may be south pole. The second magnetic member 42 may include a first magnetic portion 421 and a second magnetic portion 422 which have opposite polarities. For example, the first magnetic portion 421 may be north pole while the second magnetic portion 422 may be south pole. The third magnetic member 43 may include a first magnetic portion 431 and a second magnetic portion 432 which have opposite polarities. For example, the first magnetic portion 431 may be north pole while the second magnetic portion 432 may be south pole. As shown, the first magnetic portion 411 and the second magnetic portion 412 are arranged in a direction substantially parallel to the second movable direction D2, the first magnetic portion 421 and the second magnetic portion 422 are arranged in a direction substantially parallel to the second movable direction D2, and the first magnetic portion 431 and the second magnetic portion 432 are arranged in a direction substantially parallel to the second movable direction D2; in other words, the opposite poles of each of the first magnetic member 41, the second magnetic member 42, and the third magnetic member 43 are arranged in the second movable direction D2.

Figure 4:
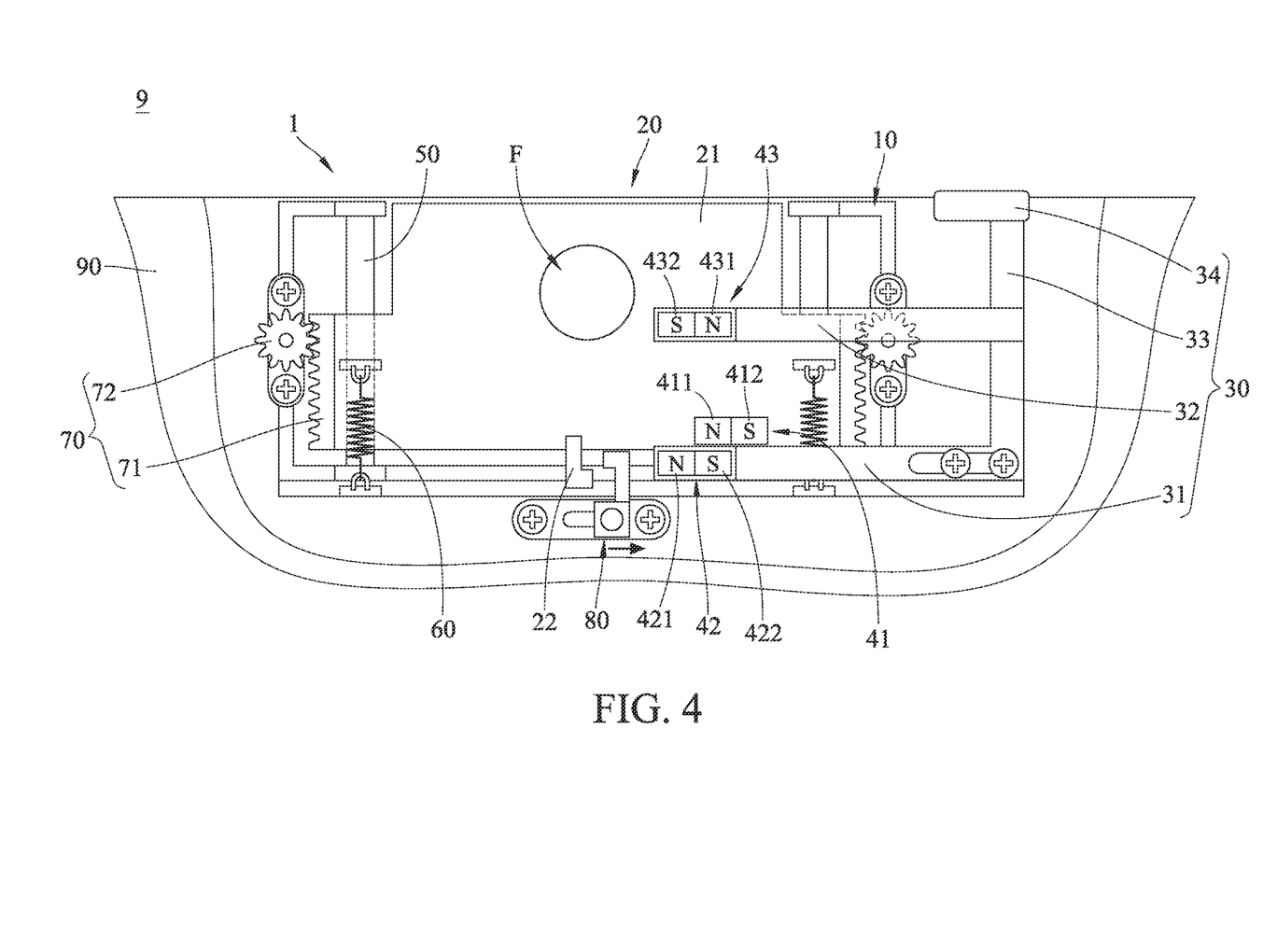
FIGS. 4-5 depict the operation of the elevating mechanism in FIG. 2.
Figure 5:
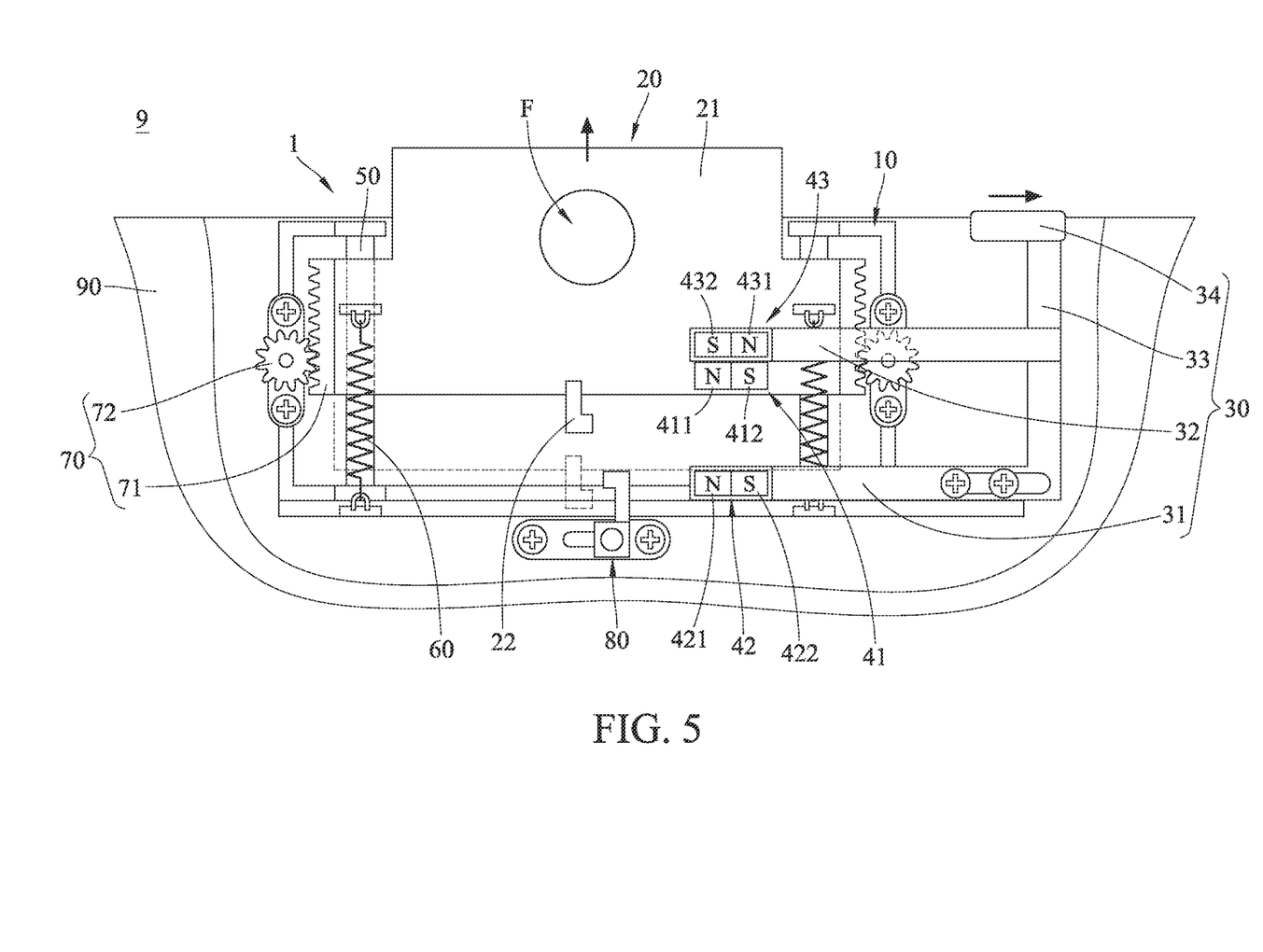

In this arrangement, as shown in FIG. 2 or FIG. 4, when the second movable member 30 is in the holding position, the second magnetic portion 422 of the second magnetic member 42 and the first magnetic portion 431 of the third magnetic member 43 which are arranged on the second movable member 30 are aligned with the first magnetic portion 411 of the first magnetic member 41 in a direction substantially parallel to the first movable direction D1; in other words, when the second movable member 30 is in the holding position, the first magnetic portion 411 of the first magnetic member 41 is located between the second magnetic portion 422 of the second magnetic member 42 and the first magnetic portion 431 of the third magnetic member 43. Thus, when the second movable member 30 is in the holding position, the first magnetic portion 411 of the first magnetic member 41 and the second magnetic portion 422 of the second magnetic member 42 attract each other, and the first magnetic portion 411 of the first magnetic member 41 and the first magnetic portion 431 of the third magnetic member 43 repel each other, thereby forcing the first movable member 20 to move towards the hidden position and keeping the first movable member 20 in the hidden position.

On the other hand, referring to FIGS. 2 and 5, when the second movable member is moved to the activating position, the first magnetic portion 421 and the second magnetic portion 422 of the second magnetic member 42 are respectively aligned with the first magnetic portion 411 and the second magnetic portion 412 of the first magnetic member 41 along a direction substantially parallel to the first movable direction D1, and the second magnetic portion 432 and the first magnetic portion 431 of the third magnetic member 43 are respectively aligned with the first magnetic portion 411 and the second magnetic portion 412 of the first magnetic member 41 along a direction substantially parallel to first movable direction D1; in other words, when the second movable member 30 is in the activating position, the first magnetic portion 411 of the first magnetic member 41 is located between the first magnetic portion 421 of the second magnetic member 42 and the second magnetic portion 432 of the third magnetic member 43, and the second magnetic portion 412 of the first magnetic member 41 is located between the second magnetic portion 422 of the second magnetic member 42 and the first magnetic portion 431 of the third magnetic member 43.

Therefore, when the second movable member 30 is in the activating position, magnetic repulsion, which occurs between the first magnetic portion 411 of the first magnetic member 41 and the first magnetic portion 421 of the second magnetic member 42, and between the second magnetic portion 412 of the first magnetic member 41 and the second magnetic portion 422 of the second magnetic member 42, forces the first movable member to move towards the lifted position. This makes the first magnetic member 41 move towards the third magnetic member 43 so that the magnetic attraction, which occurs between the first magnetic portion 411 of the first magnetic member 41 and the second magnetic portion 432 of the third magnetic member 43, and between the second magnetic portion 412 of the first magnetic member 41 and the first magnetic portion 431 of the third magnetic member 43, can assist the first movable member 20 in moving towards the lifted position and keep the first movable member 20 in the lifted position.

Optionally, the second movable member 30 may further include an operative portion 34. The operative portion 34 may be connected to the first extension portion 31 and the second extension portion 32 via the connection portion 33, and is exposed from the housing 90 so that user is allowed to move the second movable member 30 by operating the operative portion 34.

Optionally, in this embodiment, the elevating mechanism 1 may further include at least one guide rod 50 fixed on the base member 10. The guide rod 50 may extend in a direction substantially parallel to the first movable direction D1 and through the main portion 21 of the first movable member 20. As such, the first movable member 20 is only movable along the first movable direction D1 relative to the base member 10 due to the guide rod 50. In this embodiment, there may be two guide rods 50 on the elevating mechanism 1, and the guide rods 50 may be respectively located adjacent to two opposite sides of the main portion 21 of the first movable member 20. It is noted that the number of the guide rod 50 is not limiting; in other embodiments, and there may be only one guide rod and more than two guide rods disposed through the main portion of the first movable member.

Optionally, in this embodiment, the elevating mechanism 1 may further include at least one elastic member 60. The elastic member 60 may be connected between the first movable member 20 and the base member 10 and therefore can stabilize the motion of the first movable member 20 along the first movable direction D1. For example, the elastic member 60 may be an extension spring. When the elevating mechanism 1 is in the hidden position, the elastic member 60 may be in a shorter length to provide a smaller restoring force or in its original state to not providing restoring force. When the elevating mechanism 1 is in the lifted position, the elastic member 60 is extended and therefore provides greater restoring force. In some other embodiments, the elastic member 60 may be a compression spring connected to the first movable member 20 and another side of the base member 10, and the elastic member 60 may be extended or compressed along with the motion of the first movable member 20 and therefore produces restoring force to cushion or stabilize the magnetic attraction or magnetic repulsion occurring between the first movable member 20 and the second movable member 30, thereby making the first movable member 20 move at a mild speed.

Optionally, in this embodiment, the elevating mechanism 1 may further include at least one cushioning assembly 70 configured to cushion the motion of the first movable member 20. The cushioning assembly 70 may include a gear rack member 71 and a gear member 72. The gear rack member 71 extends in a direction substantially parallel to the first movable direction D1. The gear rack member 71 is disposed on a side of the first movable member 20 by any suitable manner. In some other embodiments, the gear rack member 71 may be integrally formed with the first movable member 20. The gear member 72 is disposed on the base member 10 and meshed with the gear rack member 71. The gear member 72 is, for example, a damper gear. As such, the engagement between the gear rack member 71 and the gear member 72 provides cushioning to the motion of the first movable member 20 along the first movable direction D1 and therefore stabilize the magnetic attraction or magnetic repulsion occurring between the first movable member 20 and the second movable member 30, thereby making the first movable member 20 move at a mild speed.

Optionally, in this embodiment, the elevating mechanism 1 may further include a latch 80. Correspondingly, the first movable member 20 may further include an engagement portion 22 located at a side of the main portion 21. The latch 80 may be slidably disposed on the base member 10 or the housing 90 along the second movable direction D2. The latch 80 is configured to be engaged with the engagement portion 22 on the first movable member 20 so as to secure the first movable member 20 in the hidden position. In addition, as shown in FIG. 3, the elevating mechanism 1 may further include a handle 81 which is connected to the latch 80 and extends to the outside of the housing 90, thus the user is allowed to operate the latch 80 from the outside of the housing 90 by moving the handle 81.

The operation of the elevating mechanism 1 will be described hereinafter with reference to FIG. 2 and FIGS. 4-5. Firstly, in FIG. 2, when the second movable member 30 is in the holding position, the attractive force occurs between the second magnetic portion 422 of the second magnetic member 42 on the first extension portion 31 and the first magnetic portion 411 of the first magnetic member 41 on the first movable member 20 so as to keep the first movable member 20 in the hidden position. Meanwhile, the latch 80 may be engaged with the engagement portion 22 on the first movable member 20 so as to secure the first movable member 20 in the hidden position. As such, if the operative portion 34 of the second movable member 30 is accidentally moved away from the holding position, the magnetic force between the second magnetic member 42 on the second movable member 30 and the first magnetic member 41 on the first movable member 20 is prevented from causing the first movable member 20 to move in the first movable direction D1.

Then, when it is attempted to pop up the functional module F from the housing 90, the latch 80 may be released from the engagement portion 22 (as indicated by the arrow shown in FIG. 4). Then, the operative portion 34 of the second movable member 30 may be pushed as indicated by the arrow shown in FIG. 5 so as to move the second movable member 30 towards the activating position from the holding position along the second movable direction D2. During this movement, the first magnetic portion 421 and the second magnetic portion 422 of the second magnetic member 42 on the first extension portion 31 of the second movable member 30 respectively correspond to the first magnetic portion 411 and the second magnetic portion 412 of the first magnetic member 41 on the first movable member 20, thus the magnetic repulsion produced therebetween forces the first movable member 20 to move towards the lifted position from the hidden position along the first movable direction D1. As the first magnetic member 41 gradually moves closer to the third magnetic member 43, the first magnetic portion 411 and the second magnetic portion 412 of the first magnetic member 41 are respectively moved closer to the second magnetic portion 432 and the first magnetic portion 431 of the third magnetic member 43, the magnetic attraction between the first magnetic member 41 and the third magnetic member 43 becomes stronger so as to move the first movable member 20 to the lifted position and keeps the first movable member 20 in that position. As the first movable member 20 moves to the lifted position, the functional module F is moved out of the housing 90.

As discussed, the elastic potential energy stored in the elastic member 60 due to the movement of the first movable member 20 towards the lifted position is able to stabilize the magnetic attraction or magnetic repulsion that the first magnetic member 41, the second magnetic member 42, and the third magnetic member 43 act on the first movable member 20 and the second movable member 30. Also, as discussed, the engagement between the gear rack member 71 and the gear member 72 of the cushioning assembly 70 provides cushioning to the motion of the first movable member 20 along the first movable direction D1 so as to stabilize the magnetic attraction or magnetic repulsion that the first magnetic member 41, the second magnetic member 42, and the third magnetic member 43 act on the first movable member 20 and the second movable member 30, thereby making the first movable member move at a mild speed; that is, the first movable member 20 is prevented from accelerating in an unwanted manner.

The previous embodiment is exemplary but not intended to limit the disclosure. The elevating mechanism of the disclosure may be modified as required. For example, elevating mechanisms according to other exemplary embodiments of disclosure are provided below. For the purpose of simplicity, the following paragraphs may only focus on the differences between the previous and following embodiments, and the parts that the following embodiments similar to or the same as that of the previous embodiment may be comprehended with reference to the aforementioned paragraphs and therefore are omitted hereinafter. It is also noted that the same reference number denote to the same component or element.

Figure 6:
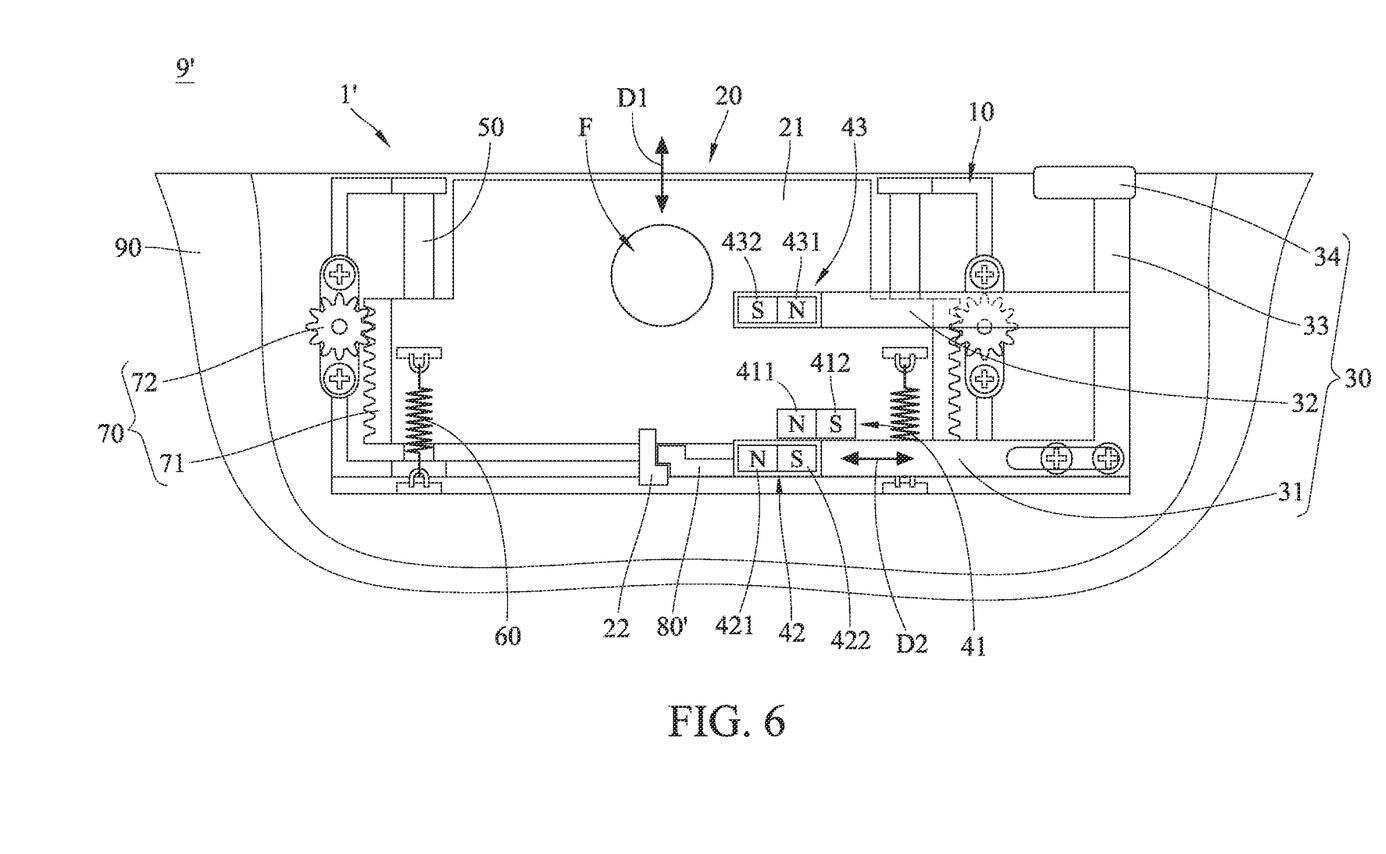
FIG. 6 is a partially enlarged view showing an elevating mechanism of an electronic device according to another embodiment of the disclosure.

Please refer to FIG. 6, another embodiment of the disclosure provides an electronic device 9' including an elevating mechanism 1' that includes a latch 80' being directly connected to the second movable member 30. For example, the latch 80' may be integrally formed with the second movable member 30. In this arrangement, the latch 80' is moved with the second movable member 30. As shown, when the second movable member 30 is in the holding position, the latch 80' is kept in a position engaging with the engagement portion 22. When the second movable member 30 is switched to the activating position from the holding position, the latch 80' is moved with the second movable member 30 and therefore is disengaged from the engagement portion 22; that is, switching the second movable member 30 to the activating position can release the limitation that the latch 80' acts to the first movable member 20 and can also permit the magnetic repulsion between the first magnetic member 41 and the second magnetic member 42 to cause the first movable member 20 to move towards the lifted position.

Figure 7:
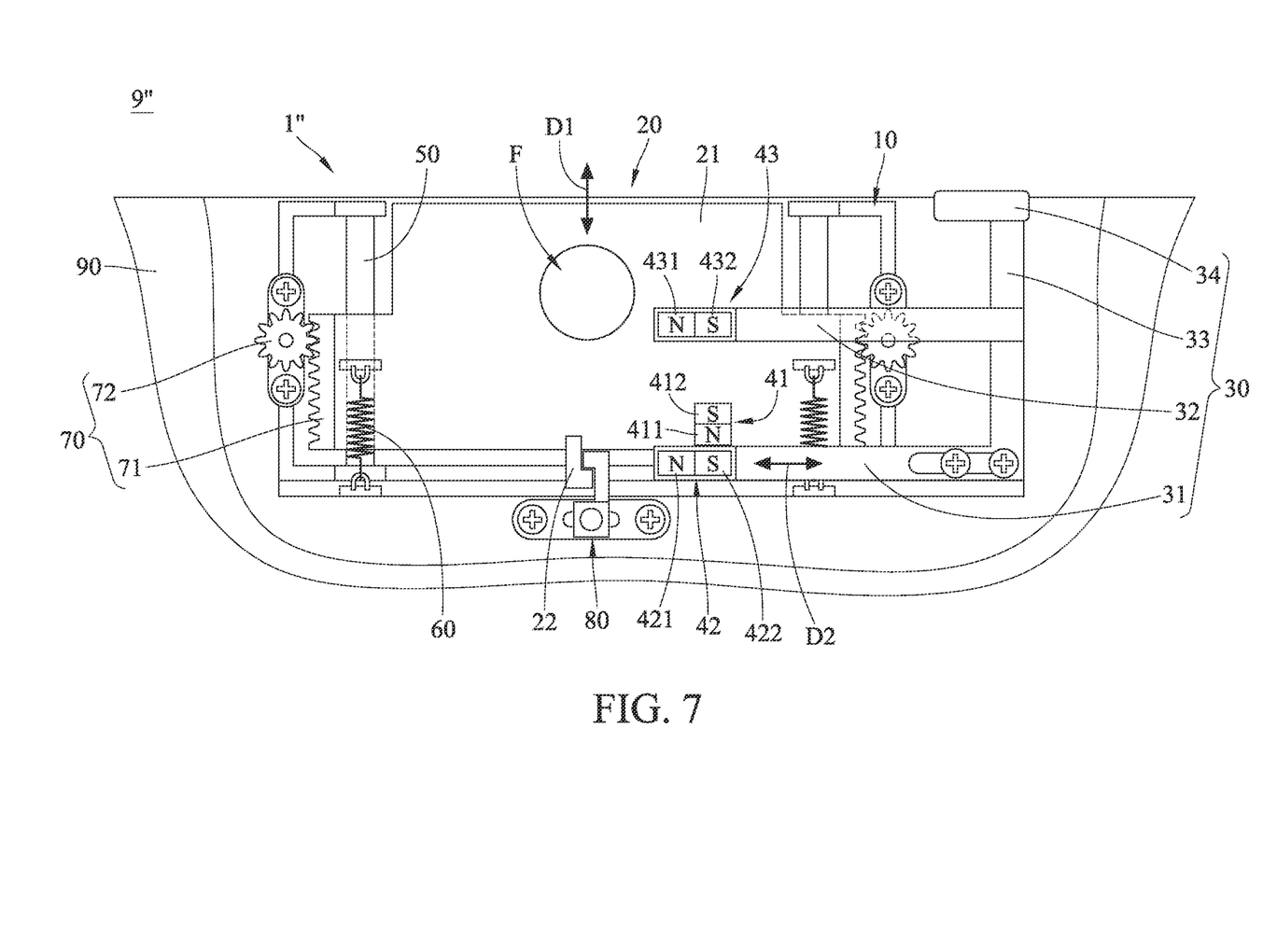
FIG. 7 is a partially enlarged view showing an elevating mechanism of an electronic device according to still another embodiment of the disclosure.

Please refer to FIG. 7, another embodiment of the disclosure provides an electronic device 9″ including an elevating mechanism 1″, in the elevating mechanism 1″, the first magnetic portion 411 and the second magnetic portion 412 of the first magnetic member 41 on the first movable member 20 are arranged along a direction substantially perpendicular to the second movable direction D2; in other words, the first magnetic portion 411 and the second magnetic portion 412 of the first magnetic member 41 are arranged along a direction substantially parallel to the first movable direction D1. In this arrangement, as shown, when the second movable member 30 is in the holding position, the second magnetic portion 422 of the second magnetic member 42 and the second magnetic portion 432 of the third magnetic member 43 respectively face towards the first magnetic portion 411 and the second magnetic portion 412 of the first magnetic member 41, thus, the first magnetic member 41 and the second magnetic member 42 at this moment produces magnetic attraction therebetween, and the first magnetic member 41 and the third magnetic member 43 produces magnetic repulsion therebetween, thereby securing the first movable member 20 in the hidden position.

Understandably, when the second movable member 30 is switched to the activating position (not shown), the first magnetic portion 421 of the second magnetic member 42 will align with the first magnetic portion 411 of the first magnetic member 41, and the first magnetic portion 431 of the third magnetic member 43 will align with the second magnetic portion 412 of the first magnetic member 41, such that the second magnetic member 42 and the first magnetic member 41 will produce magnetic repulsion therebetween to force the first movable member 20 to move towards the lifted position. As the first magnetic member 41 moves closer to the third magnetic member 43 along with the first movable member 20, the magnetic attraction between the first magnetic member 41 and the third magnetic member 43 becomes stronger and therefore assists the first movable member 20 in reaching the lifted position and secures the first movable member 20 in the lifted position.

As long as the magnets (e.g., the first magnetic member, the second magnetic member, the third magnetic member) can achieve the aforementioned interaction of the first movable member and the second movable member, their pole arrangements may be modified as required. For example, in some other embodiments, the first magnetic portion and the second magnetic portion of the first magnetic member or their poles may switch places so that the first magnetic portion may be south pole and the second magnetic portion may be north pole; correspondingly, the first magnetic portion and the second magnetic portion of the second magnetic member (or their polarities) and the first magnetic portion and the second magnetic portion of the third magnetic member (or their polarities) may switch places according to the positions of the first magnetic portion and the second magnetic portion of the first magnetic member.

In addition, the elevating mechanism may omit one of the second magnetic member and the third magnetic member. For example, in some embodiments that the elevating mechanism omits the third magnetic member, the second movable member may be kept in the holding position with the help of the magnetic attraction between the second magnetic member and the first magnetic member so that the first movable member can be secured in the hidden position; when the second movable member is switched to the activating position, the magnetic repulsion between the second magnetic member and the first magnetic member may be strong enough to push the first movable member directly to the lifted position. For example, in some embodiments that the elevating mechanism omits the second magnetic member, when the second movable member is in the holding position, the magnetic repulsion between the third magnetic member and the first magnetic member may be enough to keep the first movable member in the hidden position; when the second movable member is switched to the activating position, the magnetic attraction between the third magnetic member and the first magnetic member may be strong enough to pull the first movable member directly up to the lifted position.

According to the elevating mechanism and the electronic device as discussed in the above embodiments of the disclosure, magnetic force produced between the first magnetic member and the second magnetic member can keep the first movable member in the hidden position or force the first movable member to move to the lifted position, thus the functional module disposed on the first movable member can stay in the housing or raise from the side of the housing when the first movable member moves. For example, the elevating mechanism can be applied under or behind the screen panel of electronic devices such as televisions, computer screens, or mobile phones, to remove the functional module such as camera from the front of the screen to expand the screen area and narrow bezel and make the functional module a pop-up component. As such, when it needs to use the functional module, the functional module can be raised from a side of the device by the first movable member; when the functional module is not in use, the functional module can be hidden behind the screen panel by the first movable member. As discussed, the elevating mechanism of the disclosure is able to achieve a convenient operation of camera while being favorable for a high screen area proportion.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An elevating mechanism, comprising:
a base member;
a first movable member movably disposed on the base member;
a second movable member movably disposed on the base member;
a first magnetic member disposed on the first movable member; and
a second magnetic member corresponding to the first magnetic member and disposed on the second movable member;
wherein when the second movable member is in a holding position, the first magnetic member and the second magnetic member are attracted to each other; and
wherein the first magnetic member and the second magnetic member each comprises a first magnetic portion and a second magnetic portion which have opposite polarities; and, when the second movable member is in the holding position, the first magnetic portion of the first magnetic member and the second magnetic portion of the second magnetic member are attracted to each other.

2. The elevating mechanism according to claim 1, wherein when the second movable member is in an activating position, the first magnetic member and the second magnetic member repel each other.

3. The elevating mechanism according to claim 2, wherein the first movable member is movable between a hidden position and a lifted position along a first movable direction, the second movable member is movable between the holding position and the activating position along a second movable direction, and the first movable direction is different from the second movable direction.

4. The elevating mechanism according to claim 3, wherein the first magnetic portion and the second magnetic portion of the first magnetic member are arranged along the second movable direction, and the first magnetic portion and the second magnetic portion of the second magnetic member are arranged along the second movable direction.

5. The elevating mechanism according to claim 4, further comprising a third magnetic member disposed on the second movable member, and at least part of the first magnetic member is located between the second magnetic member and the third magnetic member; and, when the second movable member is in the activating position, the first magnetic member and the third magnetic member are attracted to each other.

6. The elevating mechanism according to claim 5, wherein the third magnetic member comprises the first magnetic portion and the second magnetic portion which have opposite polarities; and, when the second movable member is in the activating position, the first magnetic portion of the first magnetic member and the second magnetic portion of the third magnetic member are attracted to each other, and the second magnetic portion of the first magnetic member and the first magnetic portion of the third magnetic member are attracted to each other.

7. The elevating mechanism according to claim 6, wherein the first magnetic portion and the second magnetic portion of the third magnetic member are arranged along the second movable direction.

8. The elevating mechanism according to claim 3, wherein the first magnetic portion and the second magnetic portion of the first magnetic member are arranged along the first movable direction, and the first magnetic portion and the second magnetic portion of the second magnetic member are arranged along the second movable direction.

9. The elevating mechanism according to claim 1, further comprising a cushioning assembly configured to cushion the first movable member.

10. An electronic device, comprising:
a housing; and
the elevating mechanism according to claim 1;
wherein the base member is disposed on the housing.

11. The electronic device according to claim 10, wherein when the second movable member is in an activating position, the first magnetic member and the second magnetic member repel each other.

12. The electronic device according to claim 11, wherein the first movable member is movable between a hidden position and a lifted position along a first movable direction, the second movable member is movable between the holding position and the activating position along a second movable direction, and the first movable direction is different from the second movable direction.

13. The electronic device according to claim 12, wherein the first magnetic portion and the second magnetic portion of the first magnetic member are arranged along the second movable direction, and the first magnetic portion and the second magnetic portion of the second magnetic member are arranged along the second movable direction.

14. The electronic device according to claim 13, wherein the elevating mechanism further comprises a third magnetic member disposed on the second movable member, and at least part of the first magnetic member is located between the second magnetic member and the third magnetic member; and, when the second movable member is in the activating position, the first magnetic member and the third magnetic member are attracted to each other, and the first movable member is moved towards the lifted position.

15. The electronic device according to claim 14, wherein the third magnetic member comprises the first magnetic portion and the second magnetic portion which have opposite polarities; and, when the second movable member is in the activating position, the first magnetic portion of the first magnetic member and the second magnetic portion of the third magnetic member are attracted to each other, and the second magnetic portion of the first magnetic member and the first magnetic portion of the third magnetic member are attracted to each other.

16. The electronic device according to claim 15, wherein the first magnetic portion and the second magnetic portion of the third magnetic member are arranged along the second movable direction.

17. The electronic device according to claim 12, wherein the first magnetic portion and the second magnetic portion of the first magnetic member are arranged along the first movable direction, and the first magnetic portion and the second magnetic portion of the second magnetic member are arranged along the second movable direction.

18. The electronic device according to claim 10, wherein the elevating mechanism further comprises a cushioning assembly configured to cushion the first movable member.

19. An elevating mechanism, comprising:
a base member;
a first movable member movably disposed on the base member;
a second movable member movably disposed on the base member;
a first magnetic member disposed on the first movable member; and
a second magnetic member corresponding to the first magnetic member and disposed on the second movable member;
wherein when the second movable member is in a holding position, the first magnetic member and the second magnetic member are attracted to each other;
wherein the first movable member comprises a main portion and an engagement portion connected to a side of the main portion, and the first magnetic member is disposed on the main portion, and, when the engagement portion is releasably engaged with a latch, the first movable member is secured in a hidden position.

20. An electronic device, comprising:
a housing; and
the elevating mechanism according to claim 19; and
wherein the base member is disposed on the housing.

* * * * *